(12) United States Patent
Iida et al.

(10) Patent No.: US 11,555,254 B2
(45) Date of Patent: *Jan. 17, 2023

(54) INSULATED CONDUCTOR AND INSULATED CONDUCTOR MANUFACTURING METHOD

(71) Applicant: MITSUBISHI MATERIALS CORPORATION, Tokyo (JP)

(72) Inventors: Shintaro Iida, Amagasaki (JP); Hideaki Sakurai, Amagasaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 305 days.

This patent is subject to a terminal disclaimer.

(21) Appl. No.: 16/765,015

(22) PCT Filed: Nov. 20, 2018

(86) PCT No.: PCT/JP2018/042811
§ 371 (c)(1),
(2) Date: May 18, 2020

(87) PCT Pub. No.: WO2019/102989
PCT Pub. Date: May 31, 2019

(65) Prior Publication Data
US 2020/0399778 A1 Dec. 24, 2020

(30) Foreign Application Priority Data

Nov. 21, 2017 (JP) .............................. JP2017-223535
Nov. 16, 2018 (JP) .............................. JP2018-215923

(51) Int. Cl.
*H01B 3/44* (2006.01)
*C25D 15/00* (2006.01)
(Continued)

(52) U.S. Cl.
CPC ............ *C25D 15/00* (2013.01); *H01B 3/445* (2013.01); *H01B 13/0016* (2013.01); *H01B 13/06* (2013.01); *H01B 13/30* (2013.01)

(58) Field of Classification Search
CPC .... C25D 15/00; H01B 3/445; H01B 13/0016; H01B 13/06; H01B 13/30
See application file for complete search history.

(56) References Cited

U.S. PATENT DOCUMENTS

2008/0296041 A1* 12/2008 Fukuchi ................. H01B 3/441
174/110 R
2009/0301751 A1* 12/2009 Iwasaki ..................... C08F 8/00
524/401
2015/0203679 A1* 7/2015 Ueda ....................... C08L 71/00
525/151

FOREIGN PATENT DOCUMENTS

CN 101088130 A 12/2007
CN 102334167 A 1/2012
(Continued)

OTHER PUBLICATIONS

Supplementary European Search Report dated Jul. 12, 2021, issued for European Patent Application No. 18880415.7.
(Continued)

*Primary Examiner* — Krystal Robinson
(74) *Attorney, Agent, or Firm* — Locke Lord LLP

(57) ABSTRACT

An insulated conductor of the present invention is an insulated conductor having a conductor and an insulating film provided on a surface of the conductor, in which the insulating film has a low-concentration fluorine layer disposed on a surface side of the conductor and a high-concentration fluorine layer disposed on at least a part of an outside surface of the low-concentration fluorine layer, the low-concentration fluorine layer includes a cured product of a thermosetting resin and a fluororesin and has a fluorine atom content (Continued)

relatively lower than that of the high-concentration fluorine layer, and the high-concentration fluorine layer includes a cured product of a thermosetting resin and a fluororesin and has a fluorine atom content relatively higher than that of the low-concentration fluorine layer.

9 Claims, 3 Drawing Sheets

(51) Int. Cl.
*H01B 13/00* (2006.01)
*H01B 13/06* (2006.01)
*H01B 13/30* (2006.01)

(56) References Cited

FOREIGN PATENT DOCUMENTS

| | | |
|---|---|---|
| CN | 102791452 A | 11/2012 |
| CN | 103814319 A | 5/2014 |
| CN | 103999167 A | 8/2014 |
| CN | 205542046 U | 8/2016 |
| EP | 0972805 A2 | 1/2000 |
| EP | 3584293 A1 | 12/2019 |
| EP | 3716292 A1 | 9/2020 |
| JP | H02-037619 A | 2/1990 |
| JP | H10-334739 A | 12/1998 |
| JP | 2001-508588 A | 6/2001 |
| JP | 2002-298674 A | 10/2002 |
| JP | 2003-151754 A | 5/2003 |
| JP | 2005-259419 A | 9/2005 |
| JP | 2006-004681 A | 1/2006 |
| JP | 2010-100905 A | 5/2010 |
| JP | 2010-238662 A | 10/2010 |
| JP | 2013-187029 A | 9/2013 |
| JP | 2018-029004 A | 2/2018 |
| WO | 98/31022 A1 | 7/1998 |
| WO | 2011/024809 A1 | 3/2011 |

OTHER PUBLICATIONS

Notice of Allowance dated Apr. 6, 2021, issued for Chinese patent application No. 201880073.792.1 and English translation of the search rerport.
International Search Report dated Jan. 8, 2019, issued for PCT/JP2018/042811 and English translation thereof.
Office Action dated Jul. 5, 2022, issued for Japanese Patent Application No. 2018-215924 and a machine English translation obtained by Global Dossier on Jul. 29, 2022.
International Search Report dated Jan. 8, 2019, issued for PCT/JP2018/042816 and English translation thereof.
International Search Report dated Feb. 2, 2021, issued for Chinese Patent Application No. 201880074817.X and an English translation of the Search Report.
Supplementary European Search Report dated Jul. 12, 2021, issued for European Patent Applicaton No. 18880525.3.
Office Action dated Apr. 26, 2022, issued for Taiwanese Patent Application No. 107141422 and a machine English translation obtained on Jun. 13, 2022.

* cited by examiner

INSULATED CONDUCTOR AND INSULATED CONDUCTOR MANUFACTURING METHOD

TECHNICAL FIELD

The present invention relates to an insulated conductor and an insulated conductor manufacturing method.

Priority is claimed on Japanese Patent Application No. 2017-223535, filed on Nov. 21, 2017, and Japanese Patent Application No. 2018-215923, filed on Nov. 16, 2018, the contents of which are incorporated herein by reference.

BACKGROUND ART

Insulated conductors obtained by coating a conductor such as a copper wire with an insulating film are used for electric coils for a variety of electric devices such as a motor or a transformer. As a material of the insulating film of the insulated conductor, thermosetting resins, particularly, polyimide-based resins such as a polyamide-imide or a polyimide are broadly used.

At the time of producing an electric coil by winding the insulated conductor around a core, there is a case where adjacent turns of the insulating film of the insulated conductor rub each other and a crack is generated in the insulating film or the insulating film exfoliates. Therefore, studies are underway regarding the improvement of the lubricity of the surface of the insulating film.

For example, Patent Literature 1 describes an insulated conductor in which a lubricative layer is formed on an insulating layer formed on the surface of a conductor. In Patent Literature 1, as an insulating coating for the formation of the lubricative layer, an insulating coating including a polyamide-imide resin and a lubricant component is described.

In addition, Patent Literature 2 describes an insulated conductor having an insulating layer that is made up of a thermosetting resin and a fluororesin and in which the mass ratio between the thermosetting resin and the fluororesin is 90:10 to 10:90. In Patent Literature 2, as the insulating layer, a layer formed by mixing a thermosetting resin solution and a fluororesin organosol, applying the obtained liquid mixture onto a conductor, and baking the liquid mixture is used. Patent Literature 2 describes that, when the insulating layer is formed from the liquid mixture obtained by mixing the thermosetting resin solution and the fluororesin organosol, a thermosetting resin and a fluororesin are uniformly dispersed in the insulating layer.

Patent Literature 3 describes an electric insulated wire in which an insulating film provided on a conductor is formed of at least two kinds of resin components and an interface between the two or more kinds of resins does not have a clear interface, but has an interface having a continuous or stepwise concentration of the resin component. In Patent Literature 3, a fluororesin is described as the resin component. In addition, in Patent Literature 3, as an electric insulated wire manufacturing method, a method including a step of forming an extruded insulating layer on the surface of an electric wire provided with a conductor or an insulating layer using a melt obtained by melting and mixing at least two kinds of thermoplastic resins and then, or simultaneously, holding the extruded insulating layer for a certain period of time at a temperature lower than the melting point or softening point of a resin having the highest melting point or softening point among the thermoplastic resins by 0° C. to 100° C. is described.

CITATION LIST

Patent Literature

[Patent Literature 1]
  Japanese Unexamined Patent Application, First Publication No. 2010-238662
[Patent Literature 2]
  PCT International Publication No. WO2011/024809
[Patent Literature 3]
  Japanese Unexamined Patent Application, First Publication No. 2005-259419

SUMMARY OF INVENTION

Technical Problem

The formation of the lubricative layer on the insulating layer of the insulated conductor is effective as a method for improving the lubricity of the surface of the insulating film. However, it is cumbersome to form the lubricative layer by applying an insulating coating for the formation of the lubricative layer onto the insulating layer as described in Patent Literature 1, and great care is taken for the production of the insulated conductor. In addition, the insulated conductor is demanded to be resistant to the generation of damage in the film when wound in a coil shape, that is, be highly flexible. However, in the insulated conductor described in Patent Literature 1, the lubricative layer including a lubricative component and the insulating layer not including a lubricative component do not easily adhere to each other, and thus there is a concern that the lubricative layer and the insulating layer may exfoliate from each other when the insulated conductor is wound in a coil shape.

In addition, the addition of a fluororesin to the insulating layer as described in Patent Literature 2 and 3 is effective for the improvement of the lubricity of the surface of the insulating film. However, a fluororesin and resins other than the fluororesin have a low affinity to each other, and thus there is a problem in that a large crack is easily generated between the fluororesin and resins other than the fluororesin.

The present invention has been made in consideration of the above-described circumstance, and an object of the present invention is to provide an insulated conductor in which the lubricity of the surface of an insulating film is favorable, the flexibility of the insulating film is favorable, and a large crack is not easily generated in the insulating film. In addition, another object of the present invention is to provide an insulated conductor manufacturing method capable of manufacturing in an industrially advantageous manner an insulated conductor in which the lubricity of the surface of an insulating film is favorable, the flexibility of the insulating film is favorable, and a large crack is not easily generated in the insulating film.

Solution to Problem

In order to achieve the above-described objects, an insulated conductor of the present invention is an insulated conductor including: a conductor; and an insulating film provided on a surface of the conductor, in which the insulating film has a low-concentration fluorine layer disposed on a surface side of the conductor and a high-concentration fluorine layer disposed on at least a part of an outside surface of the low-concentration fluorine layer, the low-concentration fluorine layer includes a cured product of a thermosetting resin and a fluororesin and has a fluorine atom content relatively lower than that of the high-concentration fluorine layer, and the high-concentration fluorine layer includes a cured product of a thermosetting resin and a fluororesin and has a fluorine atom content relatively higher than that of the low-concentration fluorine layer.

According to the insulated conductor of the present invention configured as described above, the high-concentration fluorine layer having a fluorine atom content relatively higher than that of the low-concentration fluorine layer is disposed on at least a part of the outside surface of the low-concentration fluorine layer, and thus the fiction coefficient of the surface of the insulating film becomes low, and the lubricity becomes favorable. In addition, the content of the fluororesin in the low-concentration fluorine layer is relatively low, and thus a crack is not easily generated in the low-concentration fluorine layer. Furthermore, the low-concentration fluorine layer and the high-concentration fluorine layer each include the cured product of the thermosetting resin and the fluororesin and have a common composition, and thus the adhesion between the low-concentration fluorine layer and the high-concentration fluorine layer becomes favorable. In addition, the low-concentration fluorine layer and the high-concentration fluorine layer include the thermosetting resin and are thus not easily distorted by heat and are capable of maintaining favorable adhesion between the high-concentration fluorine layer and the low-concentration fluorine layer even at a high temperature. Therefore, even when wound in a coil shape, the low-concentration fluorine layer and the high-concentration fluorine layer do not easily exfoliate from each other, and the flexibility improves.

Here, in the insulated conductor of the present invention, it is preferable that the fluororesin included in the low-concentration fluorine layer is a thermoplastic resin, and the fluororesin included in the high-concentration fluorine layer is a thermoplastic resin.

In this case, the fluororesins included in the low-concentration fluorine layer and the high-concentration fluorine layer have a low surface free energy and have poor compatibility with the thermosetting resin and thus move toward the surface of the insulating film by being heated, and thus the friction coefficient of the surface of the insulating film becomes lower, and the lubricity becomes more favorable.

In addition, in the insulated conductor of the present invention, it is preferable that the low-concentration fluorine layer has a sea-island structure made up of a sea phase including the cured product of the thermosetting resin and an island phase including the fluororesin dispersed in the sea phase.

In this case, the low-concentration fluorine layer has a discontinuous sea-island structure divided into a sea phase including the cured product of the thermosetting resin and an island phase including the fluororesin, and thus a crack between the cured product of the thermosetting resin and the fluororesin in the low-concentration fluorine layer does not easily grow, and the generation of a large crack becomes more difficult.

In addition, in the insulated conductor of the present invention, it is preferable that a difference between a fluorine atom content of the high-concentration fluorine layer and a fluorine atom content in a central region in a thickness direction of the low-concentration fluorine layer is 7 atom % or more.

In this case, the fluorine atom content of the high-concentration fluorine layer is higher than the fluorine atom content in the central region in the thickness direction of the low-concentration fluorine layer by 7 atom % or more, and thus the friction coefficient of the surface of the insulating film reliably becomes low, and the lubricity reliably becomes favorable.

In addition, in the insulated conductor of the present invention, it is preferable that the fluorine atom content of the high-concentration fluorine layer is 35 atom % or more.

In this case, the fluorine atom content of the high-concentration fluorine layer is 35 atom % or more, and thus the friction coefficient of the surface of the insulating film becomes lower, and the lubricity more reliably becomes favorable.

In addition, in the insulated conductor of the present invention, it is preferable that the low-concentration fluorine layer and the high-concentration fluorine layer are a continuous phase.

In this case, the low-concentration fluorine layer and the high-concentration fluorine layer are a continuous phase, and thus the low-concentration fluorine layer and the high-concentration fluorine layer do not easily exfoliate from each other even when wound in a coil shape, and the lubricity more reliably improves.

In addition, in the insulated conductor of the present invention, it is preferable that a thickness of the high-concentration fluorine layer is in a range of 0.5 μm or more and 5 μm or less.

In this case, the thickness of the high-concentration fluorine layer is in a range of 0.5 μm or more and 5 μm or less, and thus the strength of the high-concentration fluorine layer becomes high, and it is possible to stably make the lubricity favorable.

An insulated conductor manufacturing method of the present invention is an insulated conductor manufacturing method for manufacturing the insulated conductor, the method including: an electrodeposition step of electrodepositing an electrodeposition liquid including thermosetting resin particles and fluororesin particles to a surface of the conductor to obtain an electrodeposition layer-attached conductor; a drying step of heating and drying the electrodeposition layer-attached conductor to obtain a dried electrodeposition layer-attached conductor, and a heating step of heating the dried electrodeposition layer-attached conductor at a temperature in a range of (a melting point of the fluororesin particles−40° C.) to (the melting point of the fluororesin particles+30° C.).

According to the insulated conductor manufacturing method of the present invention configured as described above, in the heating step, the dried electrodeposition layer-attached conductor is heated at a temperature in a range of (the melting point of the fluororesin particles−40° C.) to (the melting point of the fluororesin particles+30° C.), thereby moving the fluororesin toward the surface of the dried electrodeposition layer and forming the high-concentration fluorine layer, and thus it is not necessary to carry out a step of forming a lubricative layer by applying an insulating coating for the formation of the lubricative layer onto the insulating layer. Therefore, according to the insulated conductor manufacturing method of the present invention, it is possible to manufacture an insulated conductor having favorable lubricity on the surface and having favorable flexibility in an industrially advantageous manner.

Here, in the insulated conductor manufacturing method of the present invention, it is preferable that a heating time in the heating step is five minutes or longer.

In this case, the heating time in the drying step is set to five minutes or longer, and thus it is possible to reliably move the thermoplastic fluororesin particles toward the surface of the dried electrodeposition layer, whereby it becomes possible to manufacture an insulated conductor including an insulating film having more favorable lubricity on the surface.

Advantageous Effects of Invention

According to the present invention, it becomes possible to provide an insulated conductor in which the lubricity of the surface of an insulating film is favorable, the flexibility of the insulating film is favorable, and a large crack is not easily generated in the insulating film. In addition, according to the present invention, it becomes possible to manufacture an insulated conductor in which the lubricity of the surface of an insulating film is favorable, the flexibility of the insulating film is favorable, and a large crack is not easily generated in the insulating film in an industrially advantageous manner.

DESCRIPTION OF EMBODIMENTS

Next, an insulated conductor and an insulated conductor manufacturing method which are an embodiment of the present invention will be described with reference to the accompanying drawings.

<Insulated Conductor>

Figure 1:
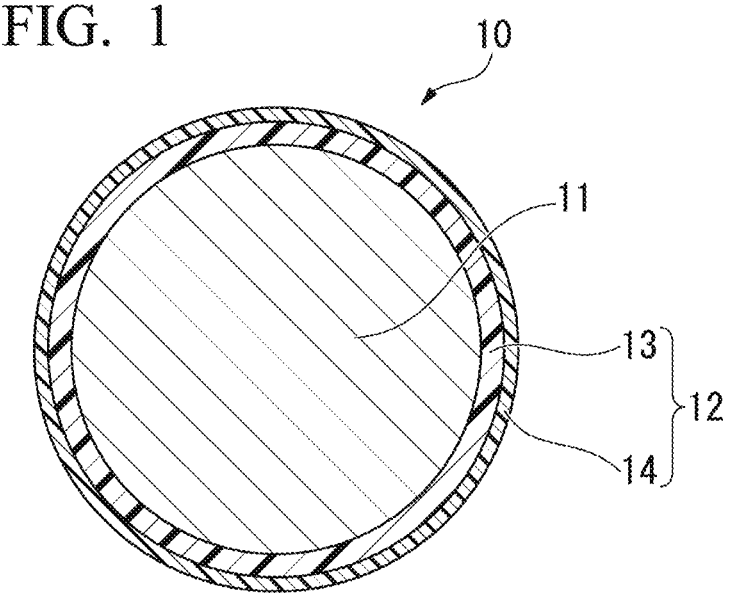
FIG. 1 is a transverse sectional view of an insulated conductor which is an embodiment of the present invention.

FIG. 1 is a transverse sectional view of an insulated conductor which is an embodiment of the present invention.

An insulated conductor 10 of the present embodiment has a conductor 11 and an insulating film 12 provided on the surface of the conductor 11 as shown in FIG. 1.

[Conductor]

The material of the conductor 11 is preferably metal having a favorable conductive property such as copper, a copper alloy, aluminum, or an aluminum alloy. The conductor 11 shown in FIG. 1 has a cross section shaped like a round metal wire, but the cross-sectional shape of the conductor 11 is not particularly limited and may be, for example, an elliptical shape or a square shape. In addition, the conductor 11 may be a metal plate.

[Insulating Film]

The insulating film 12 has a low-concentration fluorine layer 13 disposed on a surface side of the conductor 11 and a high-concentration fluorine layer 14 disposed on at least a part of an outside surface (a surface opposite to the conductor 11) of the low-concentration fluorine layer 13. The low-concentration fluorine layer 13 includes a cured product of a thermosetting resin and a fluororesin and has a fluorine atom content relatively lower than that of the high-concentration fluorine layer 14. The high-concentration fluorine layer 14 includes a cured product of a thermosetting resin and a fluororesin and has a fluorine atom content relatively higher than that of the low-concentration fluorine layer 13.

(Low-Concentration Fluorine Layer)

The low-concentration fluorine layer 13 coats the surface of the conductor 11 and has an action of insulating the conductor 11.

The low-concentration fluorine layer 13 includes a cured product of a thermosetting resin and a fluororesin. The fluororesin in the low-concentration fluorine layer 13 has an effect for reducing the relative permittivity of the low-concentration fluorine layer 13, thereby suppressing the occurrence of partial discharge and increasing the partial discharge inception voltage.

The fluororesin is preferably a thermoplastic resin having a melting point lower than the decomposition temperature of the cured product of the thermosetting resin. The melting point of the fluororesin is preferably in a range of 250° C. or higher and 350° C. or lower. The fluororesin may be a homopolymer or a copolymer. As examples of the fluororesin, perfluoroalkoxy fluororesin (PFA), polytetrafluoroethylene (PTFE), and ethylenetetrafluoride-propylene hexafluoride copolymer (FEP) can be exemplified. These fluororesins may be used singly or two or more fluororesins may be used in combination.

The thermosetting resin is preferably a resin having any one or both of an imide bond and an amide bond. As examples of the thermosetting resin, a polyamide-imide resin, a polyimide resin, a polyamic acid resin, a polyamide resin, a polyether-imide resin, and a polyester-imide resin can be exemplified. These thermosetting resins may be used singly or two or more thermosetting resins may be used in combination. The thermosetting resin is particularly preferably a polyimide-based resin (polyamide-imide resin or polyimide resin) having an imide bond.

The thickness of the low-concentration fluorine layer 13 is preferably in a range of 5 μm or more and 100 μm or less. When the thickness of the low-concentration fluorine layer 13 is in this range, it is possible to insulate the conductor 11 without impairing the flexibility of the insulating film 12.

In the low-concentration fluorine layer 13, the fluorine atom content in a central region in the thickness direction is preferably in a range of 10 atom % or more and 50 atom % or less and more preferably in a range of 20 atom % or more and 40 atom % or less. When the fluorine atom content is in this range, it is possible to reduce the relative permittivity of the low-concentration fluorine layer 13 without impairing the flexibility of the insulating film 12. The central region in the thickness direction of the low-concentration fluorine layer 13 refers to a range from a location ¼ of the thickness of the low-concentration fluorine layer 13 apart from the center in the thickness direction of the low-concentration fluorine layer 13 toward the conductor 11 side to a location ¼ of the thickness of the low-concentration fluorine layer 13 apart from the center toward the high-concentration fluorine layer 14 side. For example, in a case where the thickness of the low-concentration fluorine layer 13 is 40 μm, the central region is a range from a location 10 μm apart from the center in the thickness direction of the low-concentration fluorine layer 13 toward the conductor 11 side to a location 10 μm apart from the center toward the high-concentration fluorine layer 14 side.

Here, in the present embodiment, the fluorine atom content of the low-concentration fluorine layer 13 refers to the proportion of the number of fluorine atoms in the total number of atoms of all elements included in the low-concentration fluorine layer 13. For example, in a case where the conductor 11 is made of copper, and the low-concentration fluorine layer 13 is made of a polyamide-imide and a fluororesin, the fluorine atom content refers to the proportion of the number of fluorine (F) atoms in the total number of atoms of fluorine (F), carbon (C), nitrogen (N), oxygen (O), and copper (Cu) included in the low-concentration fluorine layer 13. The fluorine atom content in the central region in the thickness direction of the low-concentration fluorine layer 13 can be obtained by, for example, linearly analyzing the contents of individual elements along the thickness direction of the low-concentration fluorine layer 13 and computing the content of individual elements included in the central region.

The low-concentration fluorine layer 13 preferably has a sea-island structure including a sea phase (matrix phase) including the cured product of the thermosetting resin and an island phase (domain phase) including the fluororesin dispersed in the sea phase. The fact that the low-concentration fluorine layer 13 has a sea-island structure can be confirmed using a scanning electron microscope (SEM) and an energy-dispersive X-ray spectroscopy (EDS) analyzer. For example, in a case where a cross section of the low-concentration fluorine layer 13 is observed using a SEM and an EDS analyzer and a continuous portion from which no fluorine is detected (sea phase) and a portion from which granular fluorine is detected (island shape) are confirmed, it can be said that the low-concentration fluorine layer 13 has a sea-island structure.

The shape of the island phase is not particularly limited and can be a spherical shape, an elliptically spherical shape, a conic shape, a polygonal shape, a plate shape, a cylindrical shape, a polygonal column shape, and a shape obtained by combining the above-described shaped. The shape of the island phase may be a neck shape or gourd shape having a narrow necked portion between thick portions. The island phase in the necked shape or the gourd shape has a large contact area with the sea phase and improves in the adhesion to the sea phase, and thus the shape stability of the entire low-concentration fluorine layer 13 becomes favorable.

(High-Concentration Fluorine Layer)

The high-concentration fluorine layer 14 has an action for improving the lubricity of the surface of the insulating film 12.

The high-concentration fluorine layer 14 includes a cured product of a thermosetting resin and a fluororesin. The high-concentration fluorine layer 14 has a fluorine atom content relatively higher than that of the low-concentration fluorine layer 13 and thus has a low friction coefficient and favorable lubricity. The cured product of the thermosetting resin and the fluororesin included in the high-concentration fluorine layer 14 are preferably the same as the cured product of the thermosetting resin and the fluororesin included in the low-concentration fluorine layer 13. In addition, when the low-concentration fluorine layer 13 and the high-concentration fluorine layer 14 include the same cured product of the thermosetting resin and the same fluororesin, the adhesion between the low-concentration fluorine layer 13 and the high-concentration fluorine layer 14 becomes favorable, and the flexibility improves.

A difference (A−B) when the fluorine atom content of the high-concentration fluorine layer 14 is represented by A atom % and the fluorine atom content in the central region in the thickness direction of the low-concentration fluorine layer 13 is represented by B atom % is preferably 7 atom % or more. When this difference (A−B) is less than 7 atom %, there is a concern that the lubricity of the high-concentration fluorine layer 14 may not sufficiently improve. However, when the difference (A−B) becomes too large, there is a concern that, when wound in a coil shape, it is likely that the low-concentration fluorine layer 13 and the high-concentration fluorine layer 14 exfoliate from each other or are damaged. Therefore, the difference between the central region in the thickness direction of the low-concentration fluorine layer 13 and the fluorine atom content of the high-concentration fluorine layer 14 is preferably 20 atom % or less.

The fluorine atom content of the high-concentration fluorine layer 14 can be obtained by, for example, linearly analyzing the contents of individual elements along the thickness direction of the high-concentration fluorine layer 14 and computing the contents of individual elements included in the high-concentration fluorine layer 14.

In addition, the fluorine atom content of the high-concentration fluorine layer 14 is preferably 35 atom % or more. When the fluorine atom content of the high-concentration fluorine layer 14 is less than 35 atom %, there is a concern that the lubricity of the high-concentration fluorine layer 14 may not sufficiently improve. On the other hand, when the fluorine atom content of the high-concentration fluorine layer 14 becomes too large, there is a concern that the high-concentration fluorine layer 14 may become hard and, when wound in a coil shape, it is likely that the high-concentration fluorine layer may exfoliate from the low-concentration fluorine layer 13. Therefore, the fluorine atom content of the high-concentration fluorine layer 14 is preferably 60 atom % or less.

The low-concentration fluorine layer 13 and the high-concentration fluorine layer 14 may be a discontinuous phase, but are preferably a continuous phase, that is, the fluorine atom content of the high-concentration fluorine layer 14 preferably continuously increases relative to the fluorine atom content of the low-concentration fluorine layer 13.

The boundary between the low-concentration fluorine layer 13 and the high-concentration fluorine layer 14 is a location at which the concentration of fluorine changes discontinuously in a case where the low-concentration fluorine layer 13 and the high-concentration fluorine layer 14 are not a continuous phase. In addition, in a case where the low-concentration fluorine layer 13 and the high-concentration fluorine layer 14 are a continuous phase, the boundary is a location at which the fluorine atom content of the high-concentration fluorine layer becomes higher than the fluorine atom content in the central region in the thickness direction of the low-concentration fluorine layer by 7 atom %.

The thickness of the high-concentration fluorine layer 14 is preferably in a range of 0.5 µm or more and 5 µm or less. When the thickness of the high-concentration fluorine layer 14 is less than 0.5 µm, there is a concern that the lubricity may degrade and the friction coefficient may increase. On the other hand, when the thickness of the high-concentration fluorine layer 14 exceeds 5 µm, there is a concern that the high-concentration fluorine layer 14 may become hard and, when wound in a coil shape, it is likely that the high-concentration fluorine layer may exfoliate from the low-concentration fluorine layer 13.

<Insulated Conductor Manufacturing Method>

Figure 2:
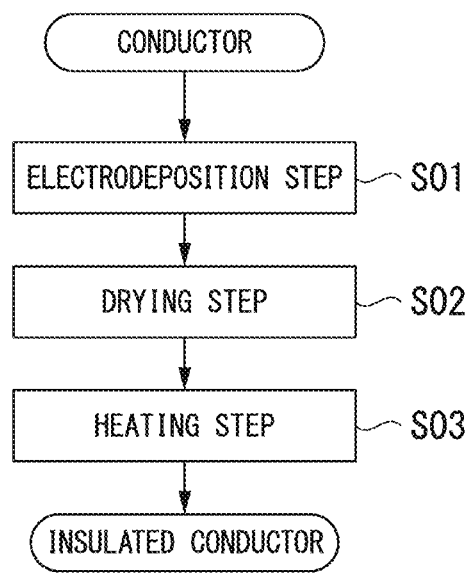
FIG. 2 is a flowchart of an insulated conductor manufacturing method which is an embodiment of the present invention.

FIG. 2 is a flowchart of an insulated conductor manufacturing method which is an embodiment of the present invention.

The insulated conductor manufacturing method of the present embodiment includes an electrodeposition step S01, a drying step S02, and a heating step S03 as shown in FIG. 2.

[Electrodeposition Step]

In the electrodeposition step S01, an electrodeposition liquid including thermosetting resin particles and fluororesin particles is electrodeposited on the surface of the conductor, thereby obtaining an electrodeposition layer-attached conductor. Here, regarding the electrodeposition liquid, a case where the thermosetting resin particles are polyimide-based resin particles having an imide bond will be described as an example.

(Electrodeposition Liquid)

The electrodeposition liquid is made up of a dispersion medium and a solid content. The solid content includes polyimide-based resin particles and fluororesin particles.

The content proportion of the fluororesin particles in the solid content is preferably in a range of 20 mass % or more and 70 mass % or less and more preferably in a range of 30 mass % or more and 70 mass % or less. In addition, the median diameter of the polyimide-based resin particles is preferably in a range of 50 nm or more and 400 nm or less and more preferably in a range of 50 nm or more and 200 nm or less. In addition, the median diameter of the fluororesin particles is preferably in a range of 50 nm or more and 500 nm or less. Furthermore, the polyimide-based resin particles preferably have a smaller median diameter than the fluororesin particles. Here, the reason for setting the preferred content proportion of the fluororesin particles in the solid content in a range of 20 mass % or more and 70 mass % or less is that, at a content proportion of less than 20 mass %, it is not possible to decrease the relative permittivity of the insulating film, and, at a content proportion of more than 70 mass %, it becomes difficult for the insulating film to form a sea-island structure. In addition, the reason for setting the preferred median diameter of the polyimide-based resin particles in a range of 50 nm or more and 400 nm or less is that, at a median diameter of less than 50 nm, the amount of the dispersion medium present between the resin particles in an electrodeposition layer formed by electrodeposition is small, and the resistance of the electrodeposition layer becomes large, and thus the electrodeposition rate becomes slow, and a long time is required to obtain an electrodeposition layer having a large thickness, and, at a median diameter of more than 400 nm, the dispersion stability of the electrodeposition liquid degrades. Furthermore, the reason for setting the preferred median diameter of the fluororesin particles in a range of 50 nm or more and 500 nm or less is that, at a median diameter of less than 50 nm, the amount of the dispersion medium present between the resin particles in the electrodeposition layer formed by electrodeposition is small, and the resistance of the electrodeposition layer becomes large, and thus the electrodeposition rate becomes slow, and a long time is required to obtain an electrodeposition layer having a large thickness, and, at a median diameter of more than 500 nm, the electrodeposition liquid agglomerate, sedimentation occurs, and the dispersion stability degrades.

The dispersion medium preferably includes a polar solvent, water, and a base. In addition, the polar solvent preferably has a higher boiling point than water. As the polar solvent, organic solvents such as N-methyl-2-pyrrolidone, 1,3-dimethyl-2-imidazoline, dimethyl sulfoxide, and N,N dimethylacetamide are exemplified. Furthermore, as the base, tri-n-propylamine, dibutylamine, piperidine, triethylamine, and the like are exemplified. The content proportion of water in the dispersion medium is preferably in a range of 10 mass % or more and 40 mass % or less and more preferably in a range of 18 mass % or more and 30 mass % or less. In addition, the content proportion of the polar solvent in the dispersion medium is preferably in a range of 60 mass % or more and 90 mass % or less, and the content proportion of the base in the dispersion medium is preferably in a range of 0.01 mass % or more and 0.3 mass % or less. Furthermore, the content proportion of the solid content in the electrodeposition liquid is preferably in a range of 1 mass % or more and 10 mass % or less.

Here, the reason for setting the preferred content proportion of water in the dispersion medium in a range of 10 mass % or more and 40 mass % or less is that, at a content proportion of less than 10 mass %, the conductivity of the electrodeposition liquid is small, and the electrodeposition layer cannot be formed by electrodeposition, and, at a content proportion of more than 40 mass %, the volatilization rate of the dispersion medium during the drying of the electrodeposition liquid becomes fast, and, when the electrodeposition layer is formed to be thick, bubbles are likely to be generated in the electrodeposition layer. In addition, the reason for setting the preferred content proportion of the polar solvent in the dispersion medium is preferably in a range of 60 mass % or more and 90 mass % or less is that, at a content proportion of less than 60 mass %, the proportion of water in the dispersion medium becomes large, the volatilization rate becomes fast, and bubbles are likely to be generated, and, at a content proportion of more than 90 mass %, the proportion of water in the dispersion medium decreases, the electrodeposition rate becomes slow, and a long time is required to obtain an electrodeposition layer having a thick film. In addition, the reason for setting the preferred content proportion of the base in the dispersion medium in a range of 0.01 mass % or more and 0.3 mass % or less is that, at a content proportion of less than 0.01 mass %, the median diameter of the polyimide-based resin particles increases, and the dispersion stability deteriorates, and, at a content proportion of more than 0.3 mass %, the median diameter of the polyimide-based resin particles decreases, the amount of the dispersion medium present between the resin particles in the electrodeposition layer formed by electrodeposition is small, and the resistance of the electrodeposition layer becomes large, and thus the electrodeposition rate becomes slow, and a long time is required to obtain an electrodeposition layer having a large thickness. Furthermore, the reason for setting the preferred content proportion of the solid content in the electrodeposition liquid in a range of 1 mass % or more and 10 mass % or less is that, at a content proportion of less than 1 mass %, the electrodeposition rate becomes slow, and a long time is required to obtain an electrodeposition layer having a large thickness, and, at a content proportion of more than 10 mass %, the dispersion stability deteriorates. The median diameter of the polyimide-based resin particles and the median diameter of the fluororesin particles are volume-based average particle diameters measured using a dynamic light scattering particle size distribution analyzer (LB-550 manufactured by Horiba, Ltd.).

Next, a manufacturing method of the electrodeposition liquid will be described.

(Synthesis of Polyimide-Based Resin Varnish)

First, in a two-liter four-neck flask including a stirrer, a cooling pipe, a nitrogen introduction pipe, and a thermometer, the polar solvent, an isocyanate component, and an acid component are mixed together, heated to a temperature of 80° C. to 130° C., held at this temperature for two to eight hours to be reacted with each other, thereby obtaining a polyimide-based resin. Here, as the isocyanate component, aromatic diisocyanates such as diphenylmethane-4,4'-diisocyanate (MDI), diphenylmethane-3,3'-diisocyanate, diphenylmethane-3,4'-diisocyanate, diphenylether-4,4'-diisocyanate, benzophenone-4,4'-diisocyanate, and diphenylsulfone-4,4'-diisocyanate and the like are exemplified, and, as the acid component, trimellitic anhydride (TMA), 1,2,5-trimellitic acid (1,2,5-ETM), biphenyltetracarboxylic dianhydride, benzophenonetetracarboxylic dianhydride, diphenylsulfonetetracarboxylic dianhydride, oxydiphthalic dianhydride (OPDA), pyromellitic dianhydride (PMDA), 4,4'-(2,2'-hexafluoroisopropylidene)diphthalic dianhydride, and the like are exemplified. After that, the polyimide-based resin synthesized above is diluted with the polar solvent, thereby preparing polyimide-based resin varnish.

(Preparation of Dispersion Liquid of Polyimide-Based Resin Particles)

Next, the polyimide-based resin varnish obtained above is further diluted with an organic solvent, a basic compound is added thereto, and then water is added thereto at room temperature under stirring. Therefore, a dispersion liquid of polyimide-based resin particles having a median diameter in a range of 50 nm or more and 400 nm or less is obtained.

(Preparation of Dispersion Liquid of Fluororesin Particles)

A commercially available dispersion of fluororesin particles is diluted with water and then stirred, thereby obtaining a dispersion liquid of fluororesin particles having a median diameter in a range of 50 nm or more and 500 nm or less.

(Preparation of Electrodeposition Liquid)

The dispersion liquid of the polyimide-based resin particles and the dispersion liquid of the fluororesin particles are mixed together, thereby obtaining an electrodeposition liquid.

(Electrodeposition)

As a method for electrodepositing the electrodeposition liquid on the surface of the conductor, it is possible to use a method in which an opposite electrode and the conductor are immersed in the electrodeposition liquid, and then a direct-current voltage is applied using the opposite electrode as a negative electrode and the conductor as a positive electrode. The direct-current voltage applied is preferably in a range of 1 V or higher and 600 V or lower. The temperature of the electrodeposition liquid during the application of the direct-current voltage is preferably in a range of 5° C. or higher and 40° C. or lower. The application time of the direct-current voltage is preferably in a range of 0.01 seconds or longer and 30 seconds or shorter.

[Drying Step]

In the drying step S02, the electrodeposition layer-attached conductor obtained in the electrodeposition step S01 is heated and dried, thereby obtaining a dried electrodeposition layer-attached conductor. The drying atmosphere of the electrodeposition layer-attached conductor is not particularly limited and may be an atmospheric atmosphere or an inert atmosphere.

The drying temperature is equal to or higher than the curing temperature of the polyimide-based resin particles, generally, 220° C. or higher, and preferably in a range of equal to or lower than the melting point of the fluororesin particles. When the drying temperature is in this range, it is possible to efficiently dry the electrodeposition layer without effusing the fluororesin particles to the outside. Due to this drying, the polyimide-based resin particles in the electrodeposition layer are cured, a sea phase including a polyimide-based resin cured product is formed, and a dried electrodeposition layer including the fluororesin particles dispersed in the sea phase is generated. The drying time fluctuates depending on factors such as the drying temperature, the size of the conductor, and the thickness of the electrodeposition layer, but is generally in a range of one minute or longer and 10 minutes or shorter.

[Heating Step]

In the heating step S03, the dried electrodeposition layer-attached conductor obtained in the drying step S02 is heated at a temperature in a range of (the melting point of the fluororesin particles−40° C.) to (the melting point of the fluororesin particles+30° C.). Due to this heat treatment, the fluororesin particles in the dried electrodeposition layer melt or soften, and the fluororesin moves on the surface of the dried electrodeposition layer, whereby a high-concentration fluorine layer is generated. The drying step S02 and the heating step S03 are preferably continuously carried out using the same heating device as in the drying step S02.

The drying atmosphere of the dried electrodeposition layer-attached conductor is not particularly limited and may be an atmospheric atmosphere or an inert atmosphere. The heating time fluctuates depending on factors such as the heating temperature, the size of the conductor, and the thickness of the electrodeposition layer, but is preferably five minutes or longer and particularly preferably in a range of five minutes or longer and 10 minutes or shorter.

According to the insulated conductor 10 of the present embodiment configured as described above, the high-concentration fluorine layer 14 having a fluorine atom content relatively higher than that of the low-concentration fluorine layer 13 is disposed on at least a part of the outside surface of the low-concentration fluorine layer 13, and thus the friction coefficient of the surface of the insulating film 12 becomes low, and the lubricity becomes favorable. In addition, the content of the fluororesin in the low-concentration fluorine layer 13 is relatively low, and thus a crack is not easily generated in the low-concentration fluorine layer 13. Furthermore, the low-concentration fluorine layer 13 and the high-concentration fluorine layer 14 each include the cured product of the thermosetting resin and the fluororesin and have a common composition, and thus the adhesion between the low-concentration fluorine layer 13 and the high-concentration fluorine layer 14 becomes favorable, even when wound in a coil shape, the low-concentration fluorine layer 13 and the high-concentration fluorine layer 14 do not easily exfoliate from each other, and the flexibility improves.

In the insulated conductor 10 of the present embodiment, the thermoplastic resin is used as the fluororesins included in the low-concentration fluorine layer 13 and the high-concentration fluorine layer 14, and thus heating facilitates the movement of the fluororesins toward the surface of the insulating film 12, whereby it is possible to make the friction coefficient of the surface of the insulating film 12 lower and make the lubricity more favorable.

In the insulated conductor 10 of the present embodiment, the low-concentration fluorine layer 13 is provided with a discontinuous sea-island structure made up of the sea phase including the cured product of the thermosetting resin and the island phase including the fluororesin dispersed in the sea phase, whereby a crack between the cured product of the thermosetting resin and the fluororesin in the low-concentration fluorine layer 13 does not easily grow, and the generation of a large crack becomes more difficult.

In the insulated conductor 10 of the present embodiment, the fluorine atom content of the high-concentration fluorine layer 14 is set to be higher than the fluorine atom content in the central region in the thickness direction of the low-concentration fluorine layer 13 by 7 atom % or more, whereby the friction coefficient of the high-concentration fluorine layer 14 reliably becomes low, and it is possible to reliably make the lubricity favorable.

In the insulated conductor 10 of the present embodiment, the fluorine atom content of the high-concentration fluorine layer 14 is set to 35 atom % or more, whereby the friction coefficient of the high-concentration fluorine layer 14 more reliably becomes low, and it is possible to more reliably make the lubricity favorable.

In the insulated conductor 10 of the present embodiment, the low-concentration fluorine layer 13 and the high-concentration fluorine layer 14 are formed as a continuous phase, whereby the low-concentration fluorine layer 13 and the high-concentration fluorine layer 14 do not easily exfoliate from each other even when wound in a coil shape, and it is possible to more reliably improve the flexibility.

In the insulated conductor 10 of the present embodiment, the thickness of the high-concentration fluorine layer 14 is set in a range of 0.5 μm or more and 5 μm or less, whereby the strength of the high-concentration fluorine layer 14 becomes high, and it is possible to stably make the lubricity favorable.

In addition, according to the insulated conductor manufacturing method of the present embodiment, in the heating step S03, the dried electrodeposition layer-attached conductor is heated at a temperature in a range of (the melting point of the fluororesin particles−40° C.) to (the melting point of the fluororesin particles+30° C.), thereby moving the fluororesin toward the surface of the dried electrodeposition layer and forming the high-concentration fluorine layer, and thus it is not necessary to carry out a step of forming a lubricative layer by applying an insulating coating for the formation of the lubricative layer onto the insulating layer. Therefore, according to the insulated conductor manufacturing method of the invention, it is possible to manufacture an insulated conductor having favorable lubricity on the surface and having favorable flexibility in an industrially advantageous manner.

Furthermore, in the insulated conductor manufacturing method of the present embodiment, the heating time in the heating step S03 is set to five minutes or longer, whereby it is possible to reliably move the thermoplastic fluororesin particles toward the surface of the dried electrodeposition layer, and thus it becomes possible to manufacture an insulated conductor including an insulating film having more favorable lubricity on the surface.

Hitherto, the embodiment of the present invention has been described, but the present invention is not limited thereto and can be appropriately modified within the scope of the technical concept of the invention.

For example, in the insulated conductor 10 shown in FIG. 1, the high-concentration fluorine layer 14 is formed so as to cover the entire surface of the low-concentration fluorine layer 13, but the configuration is not limited to this case. The high-concentration fluorine layer 14 may be formed on a part of the surface of the low-concentration fluorine layer 13. In addition, in the insulated conductor 10 of the present embodiment, a fluororesin-only layer singly including a fluororesin may be provided on the outer circumferential surface of the high-concentration fluorine layer 14 of the insulating film 12 in order to further improve the lubricity of the insulated conductor 10. In this case, the high-concentration fluorine layer 14 and the fluororesin-only layer each include the fluororesin, and thus the adhesion becomes favorable.

In addition, in the insulated conductor 10 of the present embodiment, an adhesive layer may be provided between the conductor 11 and the low-concentration fluorine layer 13 in order to further improve the adhesion between the conductor 11 and the insulating film 12. That is, the low-concentration fluorine layer 13 may be disposed so as to be in indirect or direct contact with the surface of the conductor 11. The adhesive layer is preferably a layer including a cured product of a thermosetting resin and a fluororesin and having a fluorine atom content relatively higher than that of the low-concentration fluorine layer 13 or a layer singly including a cured product of a thermosetting resin.

EXAMPLES

Next, the action and effect of the present invention will be described in more detail using examples.

Invention Example 1

[Synthesis of Polyimide-Based Resin Varnish]

First, in a two-liter four-neck flask including a stirrer, a cooling pipe, a nitrogen introduction pipe, and a thermometer, N-methyl-2-pyrrolidone (747 g) as an organic solvent, 4,4'-diphenylmethane isocyanate (298 g, 1.19 mol) as an isocyanate component, and trimellitic anhydride (227 g, 1.18 mol) as an acid component were injected and heated up to 130° C. The components were reacted at this temperature for approximately four hours, thereby obtaining a polyamide-imide resin (PAI) having a number-average molecular weight of 17,000. After that, the polyamide-imide resin synthesized above was diluted using N-methyl-2-pyrrolidone as an organic solvent such that the concentration of the polyamide-imide resin (non-volatile component) reached 20 mass %, thereby obtaining polyamide-imide varnish (polyamide-imide resin:N-methyl-2-pyrrolidone=20 mass %:80 mass %).

[Preparation of Polyimide-Based Resin Particle Dispersion Liquid]

Next, the polyamide-imide varnish obtained above (62.5 g) was further diluted with N-methyl-2-pyrolidone (140 g), tri-n-propylamine (0.5 g) which is a basic compound was added thereto, and then, while stirring this liquid at a high speed of a rotation speed of 10,000 rpm, water (47 g) was added thereto at normal temperature (25° C.). Therefore, a dispersion liquid of polyamide-imide resin particles having a median diameter of 160 nm (polyamide-imide resin particles:N-methyl-2-pyrrolidone:water:tri-n-propylamine=5 mass %:76 mass %:18.8 mass %:0.2 mass %) (250 g) was obtained.

[Preparation of Fluororesin Particle Dispersion Liquid]

A commercially available perfluoroalkoxy fluororesin (PFA) dispersion was diluted with water and then stirred, thereby obtaining a PFA particle dispersion (median diameter: 200 nm, PFA particle:water=30 mass %:70 mass %).

[Preparation of Electrodeposition Liquid for Fluororesin and Polyamide-Imide Resin-Complexed Coating]

The polyamide-imide resin (PAT) particle dispersion liquid (60 g) and the fluororesin (PFA) particle dispersion liquid (10 g) were mixed together, thereby obtaining an electrodeposition liquid (PAI particles:PFA particles:N-methyl-2-pyrrolidone:water:tri-n-propylamine=4.3 mass %:4.3 mass %:65 mass %:26.2 mass %:0.2 mass %).

[Production of Insulated Copper Wire]

An insulated copper wire was produced using the electrodeposition liquid prepared above. Specifically, first, the electrodeposition liquid was retained in an electrodeposition tank, and the temperature of the electrodeposition liquid in this electrodeposition tank was set to 20° C. Next, in a state in which a copper wire (conductor) having a length of 300 mm and a diameter of 1 mm was used as a positive electrode, a cylindrical copper plate inserted into the electrodeposition liquid in the electrodeposition tank was used as a negative electrode, and a direct-current voltage of 100 V was applied between the copper wire and the cylindrical copper plate, the copper wire and the cylindrical copper plate were held in the electrodeposition liquid in the electrodeposition tank for 30 seconds. Therefore, an electrodeposition layer-attached copper wire having an electrodeposition layer formed on the surface of the copper wire was obtained. Next, the electrodeposition layer-attached copper wire was injected into a muffle furnace and heated at 250° C. for five minutes to dry the electrodeposition layer, thereby obtaining a dried electrodeposition layer-attached copper wire. After that, the temperature of the muffle furnace was increased to 300° C., and the dried electrodeposition layer-attached copper wire was heated at the temperature for five minutes, thereby obtaining a copper wire having an insulating film having a thickness of approximately 40 μm formed on a surface. This insulating film-attached copper wire (insulated copper wire) was regarded as Invention Example 1.

Invention Examples 2 to 4

Copper wires having an insulating film having a thickness of approximately 40 μm formed on a surface were obtained in the same manner as in Example 1 except for the fact that the kind of the fluororesin particles was changed respectively as shown in Table 1. These insulating film-attached copper wires (insulated copper wires) were regarded as Invention Examples 2 to 4. In Table 1, "PFA" indicates a perfluoroalkoxy fluororesin, "FEP" indicates an ethylenetetrafluoride-propylene hexafluoride copolymer, and "PTFE" indicates polytetrafluoroethylene.

Comparative Example 1

A copper wire having an insulating film having a thickness of approximately 40 μm formed on a surface was obtained in the same manner as in Invention Example 1 except for the fact that the heat treatment of the dried electrodeposition layer-attached copper wire was not carried out. This insulating film-attached copper wire (insulated copper wire) was regarded as Comparative Example 1.

[Evaluation]

For the obtained insulated copper wires (insulated conductors), the element distributions and fluorine atom contents of the insulating film, the friction coefficient, the flexibility, and the structure of the low-concentration fluorine layer were measured using the following methods.

(Element Distributions and Fluorine Atom Contents of Insulating Film)

The element distributions were confirmed as described below. The insulated copper wire was buried in a resin and polished to obtain a cross section, and then a SEM photograph of the insulating film cross section of the insulated copper wire and an element mapping image of the fluorine atom in the insulating film cross section were captured using a SEM-EDS analyzer (manufactured by Hitachi High-Technologies Corporation, electron microscope SU8230). In addition, from the obtained SEM photograph and element mapping image, whether or not the low-concentration fluorine layer and the high-concentration fluorine layer were formed in the insulating film or whether or not the high-concentration fluorine layer was not formed and the insulating film was a single layer of an insulating layer was confirmed. In addition, regarding individual elements of fluorine (F), carbon (C), nitrogen (N), oxygen (O), and copper (Cu) in the insulating film of the insulated copper wire, the element contents in the case of regarding the total number of atoms as 100 atom % were linearly analyzed, and the element distributions in the thickness direction of the insulating film were confirmed. In addition, the thickness of the high-concentration fluorine layer was measured from the fluorine contents obtained by the linear analysis, and the fluorine contents of the high-concentration fluorine layer and the low-concentration fluorine layer or the insulating layer were computed. As the fluorine content of the high-concentration fluorine layer, the average value of the fluorine contents in the high-concentration fluorine layer was used. As the fluorine content of the low-concentration fluorine layer or the insulating layer, the average value of the fluorine contents in the central region of the low-concentration fluorine layer or the insulating layer was used. The results are shown in FIG. 3, FIG. 4, and Table 1.

(Coefficient of Static Friction)

The coefficients of static friction were measured using a speed fluctuation friction coefficient measurement instrument (TRIBOMASTER type μv1000). The results are shown in Table 1.

(Flexibility)

The flexibility was measured according to the method regulated in JIS C 3216-3:2011 (Winding wires—Test methods Part 3: Mechanical properties). The results are shown in Table 1.

(Structure of Low-Concentration Fluorine Layer)

For the insulated copper wires of Invention Examples 1 to 4 and Comparative Example 1 for which the low-concentration fluorine layer was confirmed by the measurement of the element distributions of the insulating film, the structure of the low-concentration fluorine layer was confirmed using an SEM-EDS analyzer (manufactured by Hitachi High-Technologies Corporation, electron microscope SU8230). In a case where a continuous portion from which no fluorine was detected was regarded as a sea phase including the polyamide-imide, a portion from which granular fluorine was detected was regarded as an island phase including the fluororesin, and the sea phase and the island phase were confirmed, the structure was regarded as the sea-island structure. As a result, the sea-island structure was confirmed in the insulated copper wires of Invention Examples 1 to 4 and Comparative Example 1.

TABLE 1

| | Composition of electrodeposition liquid | | | | | | Evaluation | | | | |
|---|---|---|---|---|---|---|---|---|---|---|---|
| | Thermosetting resin particles | | Fluororesin particles | | | Drying condition | Heating condition | High-concentration fluorine layer | | Low-concentration fluorine layer or insulating layer | Co-efficient |
| | Kind | Content (mass %) | Kind | Content (mass %) | Melting point (° C.) | of dried electrodeposition layer-attached copper wire | of dried electrodeposition layer-attached copper wire | Thickness (μm) | Fluorine content (atom %) | Fluorine atom content (atom %) | of static friction (−) | Flexibility |
| Invention Example 1 | PAI | 50 | PFA | 50 | 310 | 250° C. × 5 minutes | 300° C. × 5 minutes | 4 | 45 | 28 | 0.11 | 3d |
| Invention Example 2 | PAI | 50 | PFA | 50 | 290 | 250° C. × 5 minutes | 300° C. × 5 minutes | 3 | 49 | 28 | 0.11 | 3d |
| Invention Example 3 | PAI | 50 | PEP | 50 | 260 | 250° C. × 5 minutes | 300° C. × 5 minutes | 3 | 47 | 28 | 0.11 | 3d |
| Invention Example 4 | PAI | 50 | PTFE | 50 | 335 | 250° C. × 5 minutes | 300° C. × 5 minutes | 2 | 37 | 30 | 0.11 | 2d |
| Comparative Example 1 | PAI | 50 | PFA | 50 | 310 | 250° C. × 5 minutes | Heat treatment is not carried out | High-concentration fluorine layer is not formed | | 29 | 0.15 | 2d |

Figure 3A:
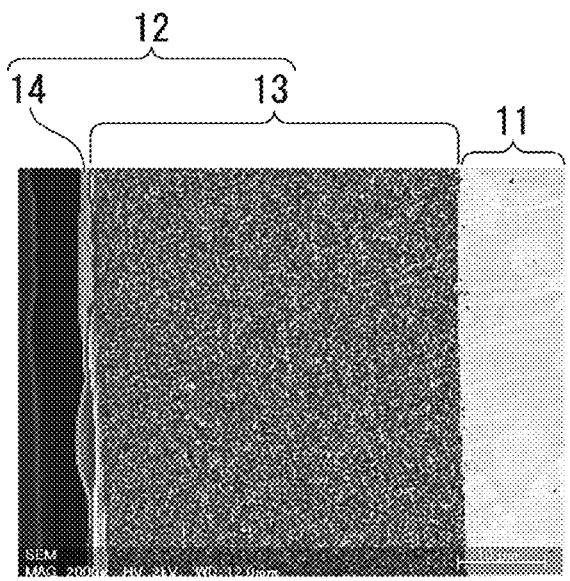
FIG. 3A is a SEM photograph of a cross section of an insulating film of an insulated copper wire obtained in Invention Example 1.
Figure 3B:
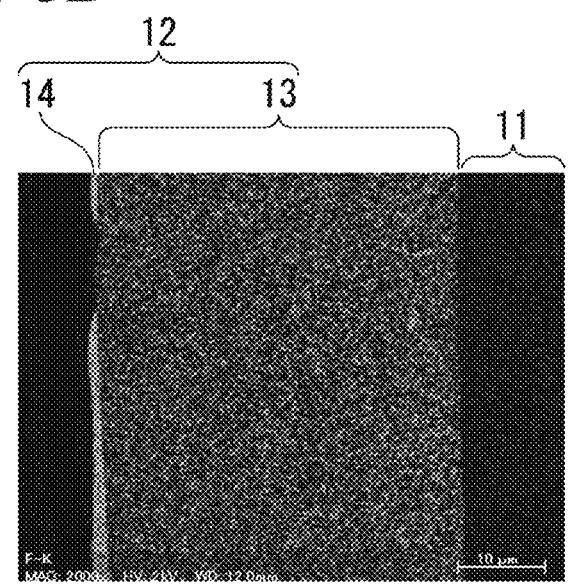
FIG. 3B is an element mapping image of a fluorine atom of FIG. 3A.
Figure 4:
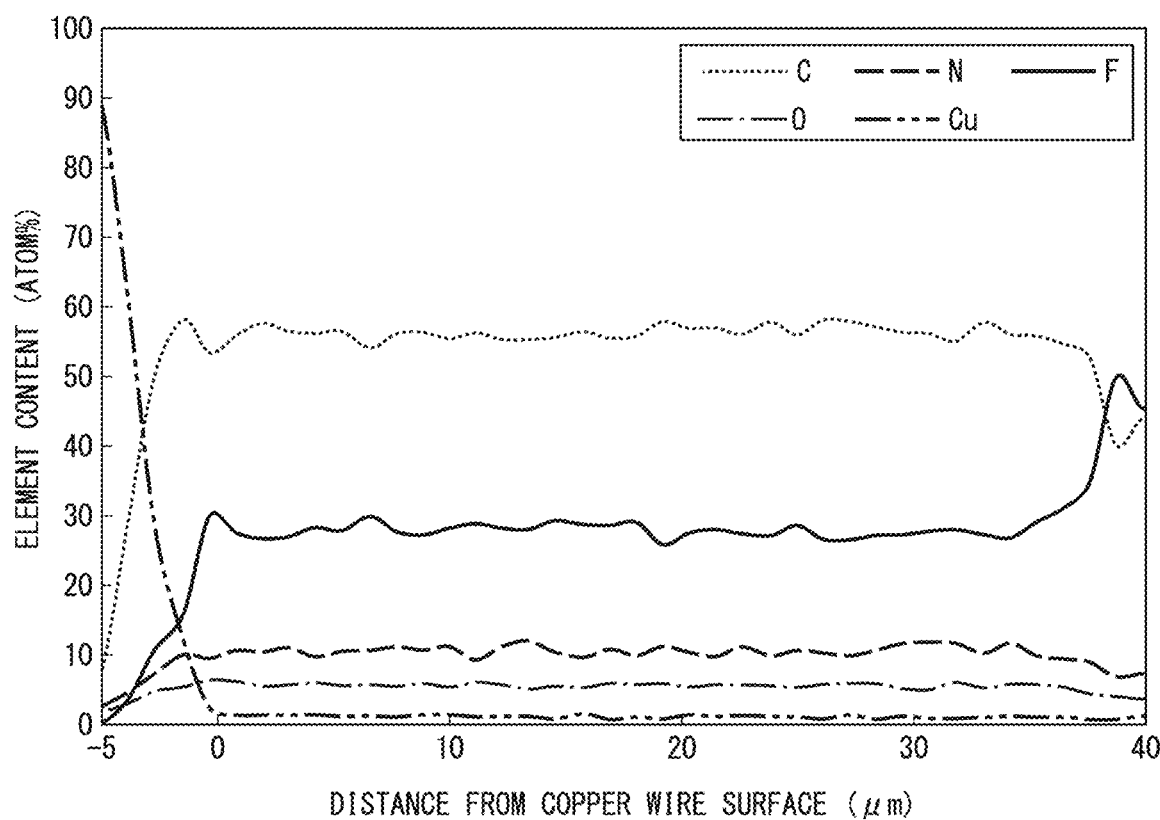
FIG. 4 is a graph showing element distributions in a thickness direction of the insulating film of the insulated copper wire obtained in Invention Example 1.

FIG. 3A is a SEM photograph of the insulating film cross section of the insulated copper wire obtained in Invention Example 1, and FIG. 3B is an element mapping image of a fluorine atom in the insulating film cross section. FIG. 4 is a graph showing the element distributions in the thickness direction of the insulating film of the insulated copper wire obtained in Invention Example 1. White portions in the element mapping image indicate a fluorine atom. From the SEM photograph of FIG. 3A and the element mapping image of a fluorine atom of FIG. 3B, in the insulated copper wire obtained in Invention Example 1, the formation of the low-concentration fluorine layer 13 and the high-concentration fluorine layer 14 in the insulating film 12 was confirmed. In addition, from the graph of FIG. 4, it was confirmed that, in the low-concentration fluorine layer and the high-concentration fluorine layer, the distributions of the individual elements changed continuously, and a continuous phase was formed.

Figure 5:
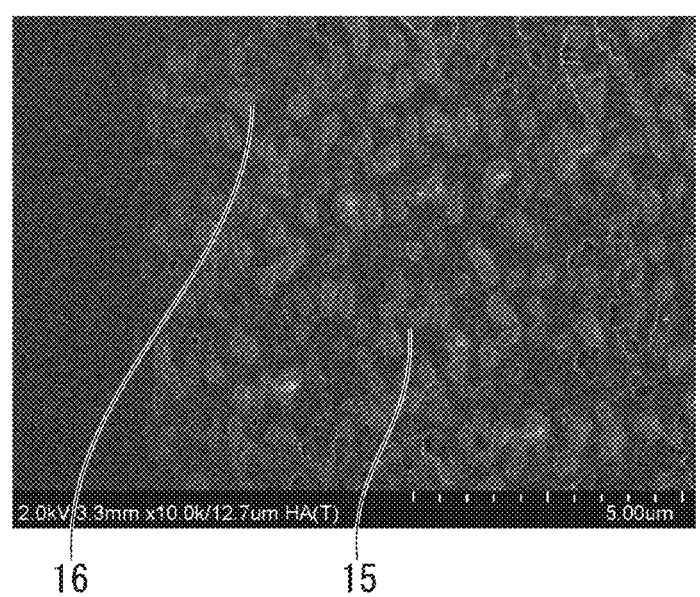
FIG. 5 is a SEM photograph of a cross section of a low-concentration fluorine layer configuring the insulating film of the insulated copper wire obtained in Invention Example 1.

FIG. 5 is a SEM photograph of a cross section of the low-concentration fluorine layer configuring the insulating film of the insulated copper wire obtained in Invention Example 1. From the SEM photograph of FIG. 5, it was confirmed that the low-concentration fluorine layer had a sea-island structure made up of a sea phase 15 including the polyamide-imide and an island phase 16 including the fluororesin dispersed in the sea phase 15.

In the insulated copper wires obtained in Invention Examples 2 to 4 as well, similar to Invention Example 1, it was confirmed that the low-concentration fluorine layer and the high-concentration fluorine layer were formed in the insulating film, in the low-concentration fluorine layer and the high-concentration fluorine layer, the distributions of the individual elements changed continuously, and a continuous phase was formed, and the low-concentration fluorine layer had the sea-island structure. In contrast, in the insulated copper wire obtained in Comparative Example 1 in which the heating treatment was not carried out on the dried electrodeposition layer-attached copper wire, the high-concentration fluorine layer was not formed in the insulating film, and the insulating film was a single layer of an insulating layer.

In addition, as shown in Table 1, in the insulated copper wire obtained in Comparative Example 1 in which the high-concentration fluorine layer was not formed, the coefficient of static friction became high.

In contrast, in all of the insulated copper wires obtained in Invention Examples 1 to 4 in which the high-concentration fluorine layer was formed, the coefficients of static friction became low.

Furthermore, as a result of evaluating the flexibility of the insulated copper wires obtained in Invention Examples 1 to 4, it was confirmed that the flexibility was favorable when the wire was wound to a diameter triple the diameter of the wire (3d), no damage was generated in the insulating film, and the wire could be wound in a coil shape. Particularly, in Invention Example 4 in which PTFE particles were used as the fluororesin particles, it was confirmed that the flexibility was favorable even when the wire was wound to a diameter double the diameter of the wire (2d), no damage was generated in the insulating film, and the wire could be wound in a coil shape.

INDUSTRIAL APPLICABILITY

In the insulated conductor of the present invention, the lubricity of the surface of the insulating film is favorable, the flexibility of the insulating film is favorable, and a large crack is not easily generated in the insulating film, and thus the insulated conductor can be advantageously used as electric coils for a variety of electric devices such as a motor or a transformer. In addition, it is possible to manufacture in an industrially advantageous manner an insulated conductor in which the lubricity of the surface of the insulating film is favorable, the flexibility of the insulating film is favorable, and a large crack is not easily generated in the insulating film using the insulated conductor manufacturing method of the present invention.

REFERENCE SIGNS LIST

10 INSULATED CONDUCTOR
11 CONDUCTOR

12 INSULATING FILM
13 LOW-CONCENTRATION FLUORINE LAYER
14 HIGH-CONCENTRATION FLUORINE LAYER
15 SEA PHASE
16 ISLAND PHASE

The invention claimed is:

1. An insulated conductor comprising:
a conductor;
and an insulating film provided on a surface of the conductor,
wherein the insulating film has a low-concentration fluorine layer disposed on a surface side of the conductor and a high-concentration fluorine layer disposed on at least a part of an outside surface of the low-concentration fluorine layer,
the low-concentration fluorine layer includes a cured product of a thermosetting resin and a fluororesin and has a fluorine atom content relatively lower than that of the high-concentration fluorine layer, and
the high-concentration fluorine layer includes a cured product of a thermosetting resin and a fluororesin and has a fluorine atom content relatively higher than that of the low-concentration fluorine layer.

2. The insulated conductor according to claim 1,
wherein the fluororesin included in the low-concentration fluorine layer is a thermoplastic resin, and the fluororesin included in the high-concentration fluorine layer is a thermoplastic resin.

3. The insulated conductor according to claim 1,
wherein the low-concentration fluorine layer has a sea-island structure made up of a sea phase including the cured product of the thermosetting resin and an island phase including the fluororesin dispersed in the sea phase.

4. The insulated conductor according to claim 1,
wherein a difference between a fluorine atom content of the high-concentration fluorine layer and a fluorine atom content in a central region in a thickness direction of the low-concentration fluorine layer is 7 atom % or more.

5. The insulated conductor according to claim 1,
wherein the fluorine atom content of the high-concentration fluorine layer is 35 atom % or more.

6. The insulated conductor according to claim 1,
wherein the low-concentration fluorine layer and the high-concentration fluorine layer are a continuous phase.

7. The insulated conductor according to claim 1,
wherein a thickness of the high-concentration fluorine layer is in a range of 0.5 μm or more and 5 μm or less.

8. An insulated conductor manufacturing method for manufacturing the insulated conductor according to claim 1, the method comprising:
an electrodeposition step of electrodepositing an electrodeposition liquid including thermosetting resin particles and fluororesin particles to a surface of the conductor to obtain an electrodeposition layer-attached conductor;
a drying step of heating and drying the electrodeposition layer-attached conductor to obtain a dried electrodeposition layer-attached conductor, and
a heating step of heating the dried electrodeposition layer-attached conductor at a temperature in a range of (a melting point of the fluororesin particles −40° C.) to (the melting point of the fluororesin particles +30° C.).

9. The insulated conductor manufacturing method according to claim 8,
wherein a heating time in the heating step is five minutes or longer.

* * * * *